United States Patent [19]
Clark et al.

[11] Patent Number: 5,425,022
[45] Date of Patent: Jun. 13, 1995

[54] DATA SWITCHING NODES

[75] Inventors: Alan D. Clark, Near Devizes; Michael N. Turner, Ipswich, both of United Kingdom

[73] Assignee: British Telecommunications public limited company, London, England

[21] Appl. No.: 161,867

[22] Filed: Dec. 6, 1993

Related U.S. Application Data

[63] Continuation of Ser. No. 761,909, filed as PCT/GB90/00929, Jun. 15, 1990, published as WO90/16121, Dec. 27, 1990, abandoned.

[30] Foreign Application Priority Data

Jun. 16, 1989 [GB] United Kingdom ............... 8913869

[51] Int. Cl.[6] .................................. H04J 3/02
[52] U.S. Cl. ............................. 370/58.3; 370/85.1
[58] Field of Search ............. 370/58.1, 58.2, 58.3, 370/85.6, 84, 60, 60.1, 94.1, 85.1, 85.9, 110.1

[56] References Cited

U.S. PATENT DOCUMENTS

| | | | |
|---|---|---|---|
| 3,881,064 | 4/1975 | Schlichte | 179/15 |
| 4,658,152 | 4/1987 | Walters | 370/84 |
| 4,685,101 | 8/1987 | Segal et al. | 370/84 |
| 4,697,262 | 9/1987 | Segal et al. | 370/84 |
| 4,764,919 | 8/1988 | Hunter et al. | 370/60 |
| 4,932,024 | 6/1990 | Bonicioli et al. | 370/85.9 |
| 5,038,347 | 8/1991 | Courtois | 370/85.9 |
| 5,124,981 | 6/1992 | Golding | 370/85.9 |

FOREIGN PATENT DOCUMENTS

| | | |
|---|---|---|
| 0186141 | 7/1986 | European Pat. Off. . |
| 0281010 | 9/1988 | European Pat. Off. . |
| 0282197 | 9/1988 | European Pat. Off. . |

OTHER PUBLICATIONS

*IEEE International Conference on Communications*, vol. 2, 1983 Acampora et al: "A Centralized-Bus Architecture For Local Area Networks," pp. 932-938.

Proceedings of the International Switching Symposium, Session 31 B Paper 6, 7-11 May 1984, Florence, Italy G. Taille et al: "A laboratory model of a signalling transfer point (STP)", pp. 1-7.

*Primary Examiner*—Douglas W. Olms
*Assistant Examiner*—Dang Ton
*Attorney, Agent, or Firm*—Nixon & Vanderhye

[57] ABSTRACT

A data switching node includes a plurality of data lines including high speed data (link) lines and low speed data (port) lines and a switch connected to the data lines. The switch is a distributed multiplexer comprising a number of switching modules connected in common to a data bus. The switching modules are arranged to communicate data with the common data bus. A control module is also connected to the bus and arranged to control the addressing of the switching modules so that data received by a switching module connected to one data line is transmitted directly via the common data bus to a switching module connected to a selected other one of the data lines in response to a control signals from the control module identifying the said switching module, the data being transmitted in association with a logical channel number associated with the switching module connected to the selected other one of the data lines. IN a method of operating a multiplexer particularly suitable for use with the data switching node a plurality of channels are received and transmitted as byte-interleaved frames. Each incoming channel is assigned a logical channel number and written to a byte or bit position of the outgoing data frame selected in accordance with the logical channel number. The outgoing frame is assembled and output substantially coincidentally with the incoming date frame.

27 Claims, 8 Drawing Sheets

SLIP ERROR

DATA SWITCHING NODES

This is a continuation of application Ser. No. 07/761,909, filed as PCT/GB90/00929, Jun. 15, 1990, published as WO90/16121, Dec. 27, 1990, now abandoned.

BACKGROUND OF THE INVENTION

1. Field of the Invention

The present invention relates to nodes for switching a number of data channels and is particularly concerned with nodes in digital networks used to switch multiplexed low speed data channels.

2. Description of Related Art

Within a high bandwidth digital channel, it is potentially possible to provide a large number of data channels at rates as low as 400 bits per second. However at the node where the low speed data channels are interfaced with the rest of the network it is necessary to provide a multiplexer for switching data between selected channels and the network. In practice conventional multiplexer designs constitute a bottleneck which prevents the full channel-carrying potential of the network from being realised. If the main data path of the network has a bandwidth, for example, of tens of kilobits per second and the low speed data paths have bandwidths of hundreds of bits per second then it would be theoretically possible to interface as many as 100 of the low speed data channels to the network via a single node. Conventional matrix switches used in multiplexers are essentially serial devices and so the multiplexer needs to function with the same high bandwidth as the main data path. Known multiplexer designs, e.g. as disclosed in EP-A-0186141 and U.S. Pat. No. 4,658,152, are inefficient in handling and switching large numbers of data channels at the high speeds which would be required in practice to provide this sort of bandwidth. In the designs of these prior art documents, data in multiplexed frames is received at a high speed data interface circuit for distribution to a number of low speed interface circuits. A translation map is addressed with the sequence number of the incoming data byte to retrieve the address (identity) of the low speed interface circuit and the data is placed on a common bus together with the destination address. In the reverse direction the map is addressed with the sequence number of the outgoing data byte to obtain the identity of the source interface circuit. This identity is placed on the bus to command the source circuit to place its data byte on the bus for receipt and assembly into a frame for transmission by the high speed interface circuit.

SUMMARY OF THE INVENTION

According to the present invention a data switching node comprises a plurality of data lines including high speed data (link) lines and low speed data (port) lines and a switch connected to the data lines and arranged to switch data from one of the data lines to a selected other one of the data lines, the switch comprising a distributed multiplexer having a number of switching modules connected in parallel to a common data bus and arranged to communicate data with the common data bus and a control means also connected to the common data bus and arranged to communicate control signals with the common data bus to control addressing of the switching modules such that data received by a source switching module connected to the one data line is transmitted directly via the common data bus to a destination switching module connected to the selected other one of the data lines in response to a control signal from the control means characterised in that the control means is arranged to associate said data received by said source switching module with the address of the destination switching module and with a respective logical channel of an outgoing multiplexed data frame of the destination switching module, in that the destination switching module is arranged to associate with that logical channel a predetermined number of free time slots in the outgoing data frame such as to provide the required capacity for that channel, and in that the destination switching module is arranged to assemble said received data into the associated time slots to the outgoing data frame in dependence upon the sequence of said predetermined number of associated time slots.

Preferably the control means includes a look-up table means arranged in response to address information associated with the data from the one data line to provide the address of the destination switching module and to enable the said destination switching module so that it reads the data from the bus and outputs it in the outgoing data frame on the selected other one of the data lines.

The present invention provides a distributed multiplexer in which the switching functions are carried out in parallel rather than serially. It is known to use line interface modules distributed along a common bus. The paper by A. S. Acampora et al published at pages 932 to 938 of IEEE International Conference on Communications Vol 2. 1983 discloses one example of such a system.

According to a second aspect of the present invention there is provided a method of operating a multiplexer including receiving a plurality of channels and transmitting the channels in respective interleaved time slots of an outgoing multiplexed data frame, characterised by the steps of assigning to an incoming channel a respective logical channel of an outgoing data frame, associating with that logical channel a predetermined number of free time slots in the outgoing data frame such as to provide the required capacity for that channel, associating the respective data in successive time slots of the incoming channel with the respective assigned logical channel, and assembling the respective data in said successive time slots into said associated time slots of the outgoing data frame in dependence upon the sequence of said predetermined number of associated time slots.

The second aspect of the present invention provides a method of operating a multiplexer which is particularly suitable for multiplexers having distributed switching modules. One possible drawback of distributed switching architectures is that there is a high addressing overhead associated with the transmission of data along the bus. This disadvantage can be overcome by using, in particular, byte interleaving in which the addressing overhead is shared amongst a number of bits. However with conventional multiplexing techniques byte interleaving tends to slow the operation of the multiplexer because there is a delay equal to at least the duration of a single frame of data before the outgoing frame of data can be assembled and transmitted. Byte interleaving increases the length of the frame and so increases this delay. The present invention overcomes this problem by associating data channels with a logical channel rather than with a predetermined position within the data frame. The logical channels are mapped flexibly onto the byte positions of the outgoing frames so that the first available position in the frame is written to and the frame is in this manner continuously filled. This enables the incoming and outgoing frames to overlap in time to the extent that they are substantially coincident and so reduces the delay associated with conventional multiplexing techniques.

Preferably the method includes detecting the occurrence of slip between incoming and outgoing data and altering the correspondence between the sequence of said predetermined number of associated time slots with regard to said respective data of the incoming channel.

This preferred aspect of the present invention relates to timing jitter which results in the data arriving at the multiplexer earlier or later than the expected time. This can potentially cause a slip to occur, which results in temporary corruption of the data stream. By this aspect of the present invention the probability of a further slip occurring is substantially reduced.

A shortcoming of existing multiplexers results from the strict mapping of data channels to byte positions which is usually required. When a channel is cleared, as the terminal using the channel has completed its call, the deallocated channel would normally be merged with other deallocated channels forming a pool of empty channel capacity from which new channels would be allocated. With a multiplexing strategy requiring strict mapping of channels to byte positions it is possible to have sufficient spare capacity to create a new channel but for the spacing of the vacant byte positions to be such that the channel cannot be allocated. A property of the present invention is that a strict mapping of channels to byte positions is not required, and hence any unused channel capacity can be allocated to new data channels.

BRIEF DESCRIPTION OF THE DRAWINGS

A data switching node in accordance with the present invention is now described in detail with reference to the accompanying drawings, in which.

DESCRIPTION OF PREFERRED EMBODIMENTS

A distributed multiplexer for interfacing low speed data channels to a high-speed data network comprises a number of switching modules connected in parallel to a common data bus 1. A control module 2 is also connected to the bus and arranged to transmit and receive control signals via the bus 1. Contention lines 3 link the switching modules in a daisy chain figuration.

The switching modules include aggregate modules A1-Am and ports P1-Pn. The aggregate modules A1-Am are arranged to transmit and receive time-division multiplexed data streams via a high-speed data path (not shown). The ports P1-Pn by contrast are arranged to transmit and receive non-multiplexed low-speed data streams via correspondingly low-bandwidth data paths.

In use, when a switching module receives data it first transmits a contention signal via the contention line 3 to gain access to the bus 1 using a contention mechanism such as a daisy chain. Having gained access to the bus the switching module then outputs the received data together with its device number which uniquely identifies the switching module in question and the byte slot number of the received data. The source device number and byte slot number are transmitted via the bus to the control module 2. The control module 2 includes a look-up table 4 (see FIG. 9) which in practice is held in RAM and originally configured via an associated microprocessor. The look-up table 4 identifies the destination device number and logical channel number appropriate to the received source device number and byte slot number and outputs this information onto the bus. The destination device then detects the signal from the control module identifying it and in response to this signal reads the data transmitted from the source device together with the logical channel number transmitted by the control module. The destination device then outputs the data, directly on its associated low-speed data channel in the case of a port module or alternatively as part of a byte-interleaved time-division multiplexed frame in the case of an aggregate module.

Figure 1:
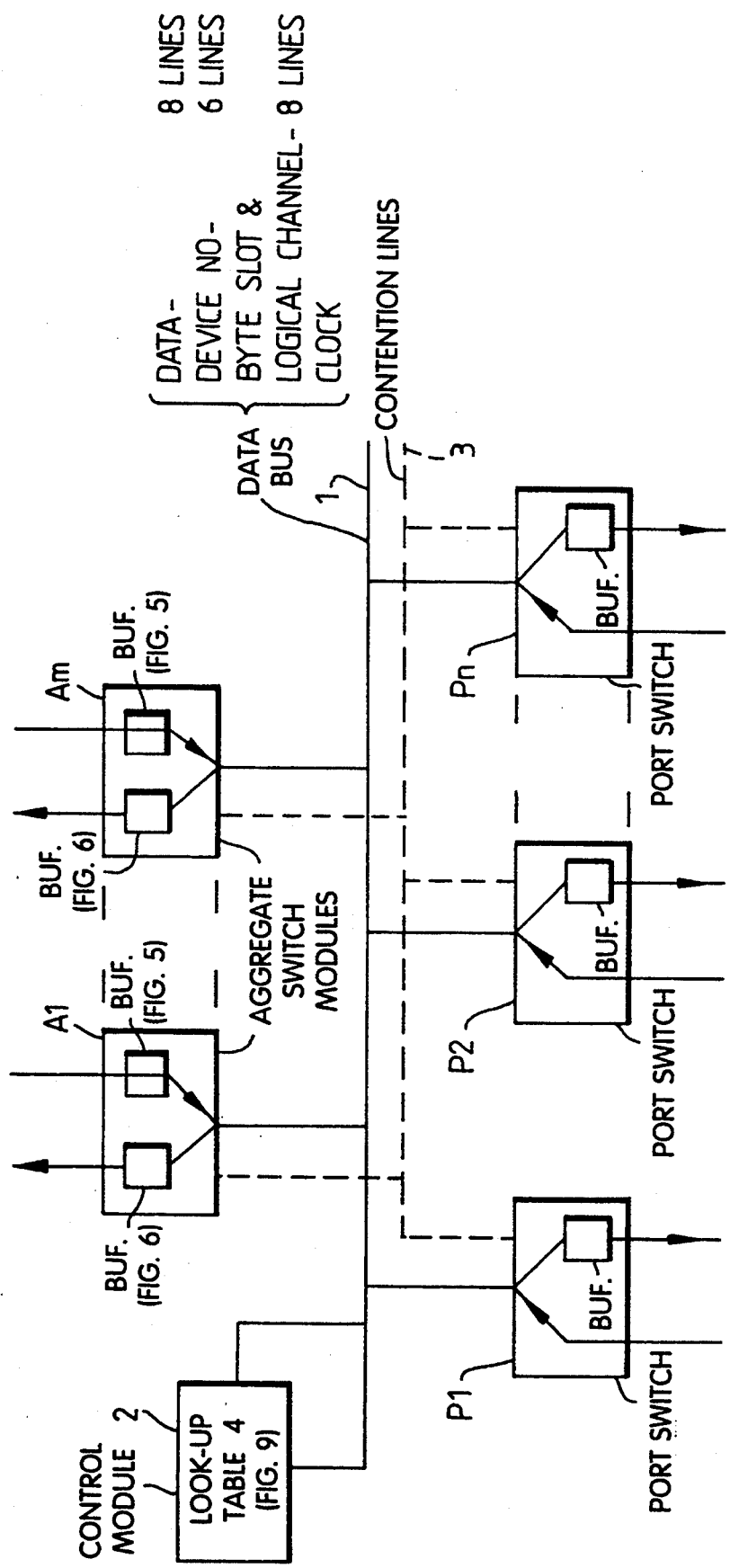
FIG. 1 is a block diagram of a multiplexer.
Figure 2:
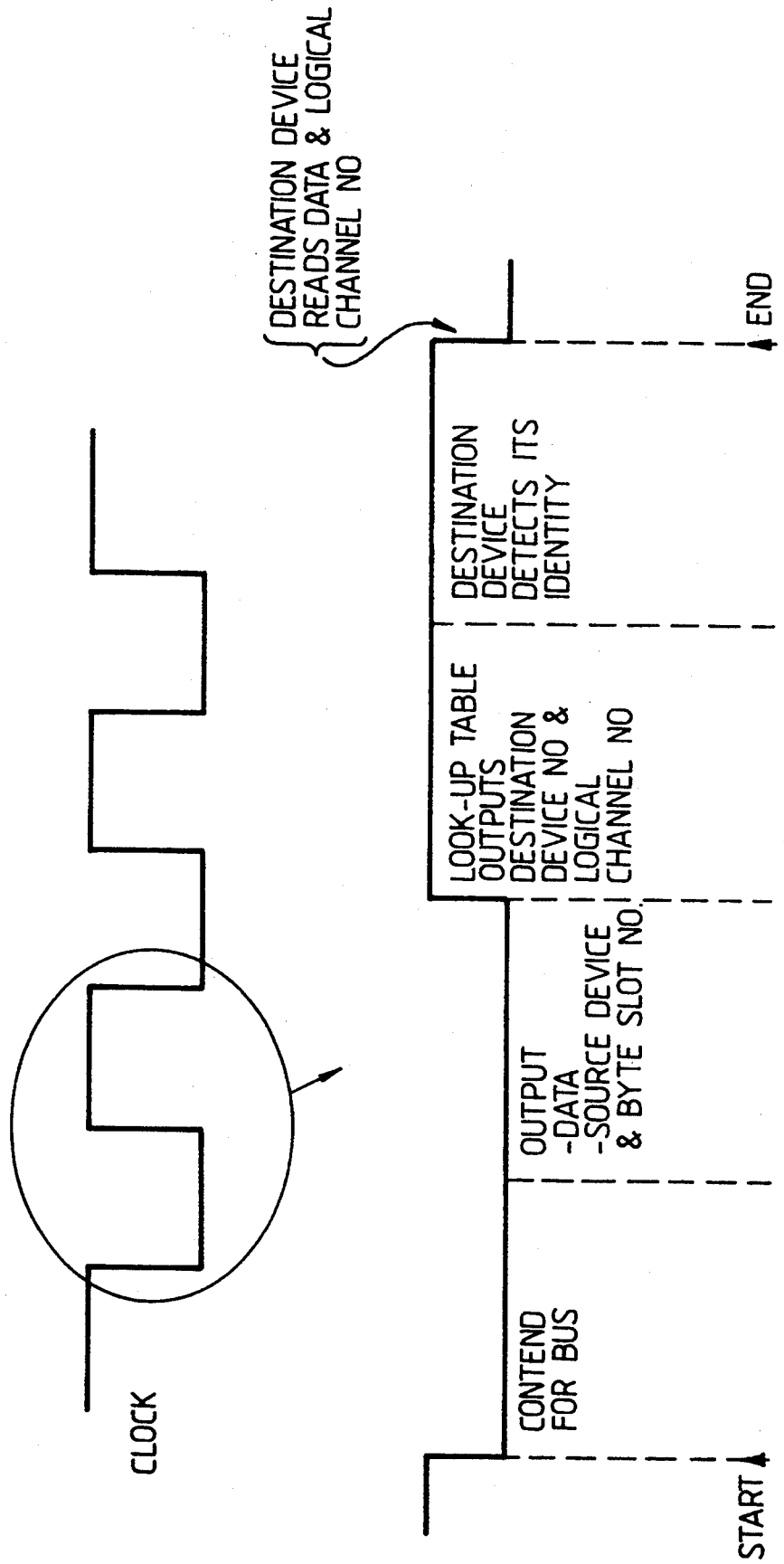
FIG. 2 is a timing diagram for the multiplexer of FIG. 1.

The timing of the above operations is illustrated schematically in FIG. 2. Each clock cycle, which will typically be of one microsecond in duration, is divided into four phases. In the first phase the receiving module contends for the bus, in the next phase that module outputs the data, in the phase after that the look-up table 4 outputs the destination device number and logical channel number and in the final phase the destination device detects its identity and then at the end of the cycle reads the data and the logical channel number.

The aggregate switching modules A1-Am include on their output sides output buffers 5 which use a linked list 6 (see FIG. 6) to control the mapping of data from the bus into slots in the outgoing data frame. The aggregate switching modules A1-Am use a multiplexing method described in greater detail below which greatly reduces the delay between incoming and outgoing frames so that the system as a whole is able to use byte interleaving without any significant penalty in terms of speed of operation.

Figure 3:
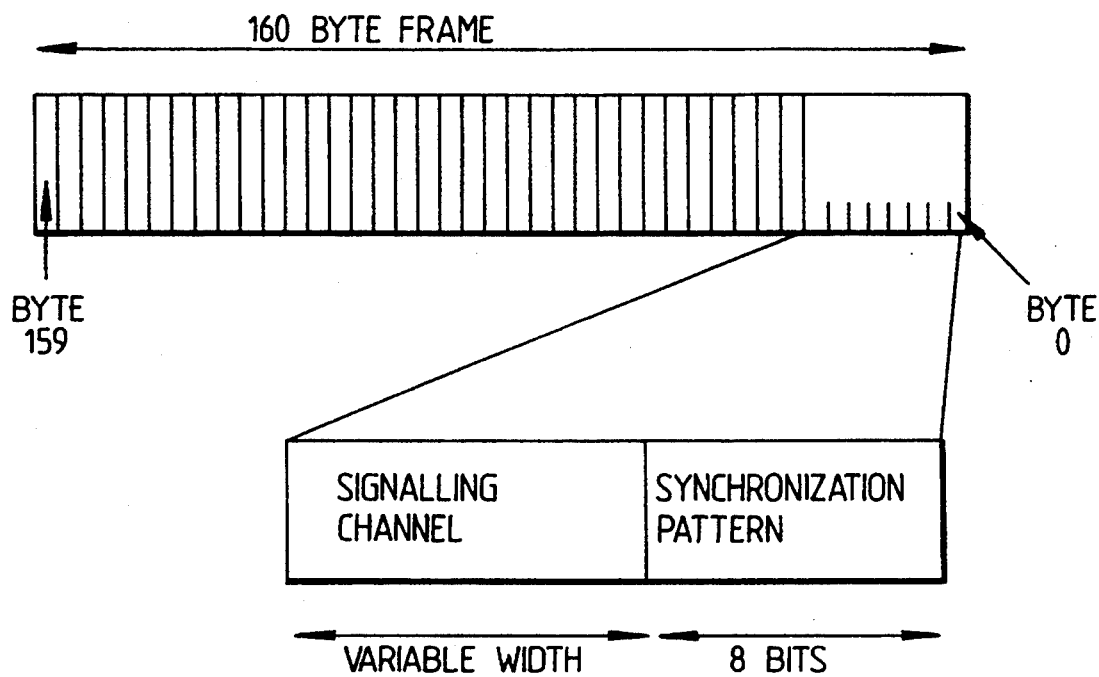
FIG. 3 is a diagram showing the format of a data frame.
Figure 4:
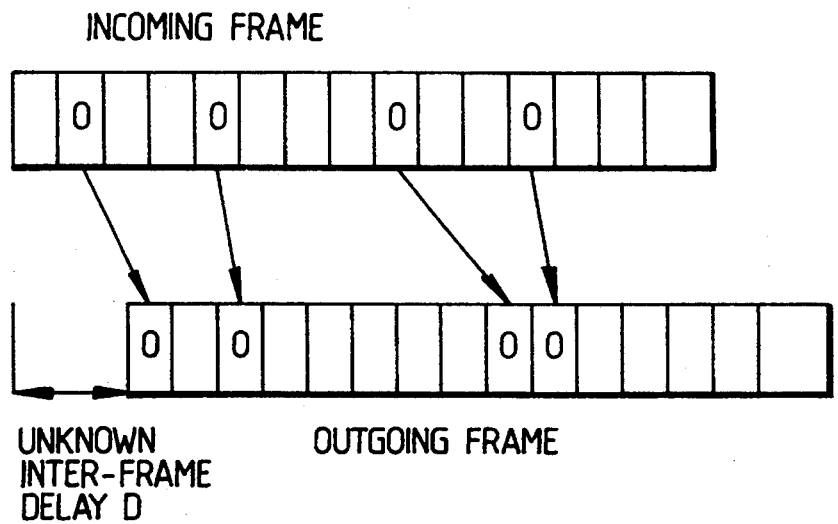
FIG. 4 is a diagram showing overlapping incoming and outgoing frames.

Data is transmitted to and from the high speed data paths in byte interleaved frames as shown in FIG. 3. Each frame contains an 8 bit synchronisation pattern, a signalling channel and a number of data bytes. Each byte within the frame corresponds to a 400 bit/s channel, hence a 1200 bit/s channel is allocated 3 bytes, a 2400 bit/s channel allocated 6 bytes and so on. The byte positions associated with each channel are identified by the logical channel number of the channel (lcn). For high-speed composite data channels with speeds lower than 64 kbit/s the frame length will be proportionally shorter (140 bytes for 58 kbits, 120 bytes for 48 kbits, 48 bytes for 19200 b/s etc). The signalling channel is normally part of the frame header but may be extended to incorporate any unused data channels. The bandwidth of the signalling channel may thus be dynamically controlled without affecting data traffic. Using logical channel mapping for the control of data switching, as shown schematically in FIG. 4, has the advantage that incoming and outgoing frames may overlap and may wander in time with respect to each other without corruption of data. Moreover the outgoing frame can be assembled and output in a continuous process so that the inter-frame delay D is reduced to a fraction of the frame's duration.

In use switching modules are interconnected using the bus. Data bytes output onto the bus are identified with the information needed to identify correctly the destination device and channel. This information is local to the multiplexer and the logical channel number is local to the specific device. If the destination is a multiplexed output the logical channel number identifies the set of byte positions that the data may be written to: if the destination is a simple port the logical channel number has no significance.

Control information relating to the state of the interfaced lines may be transferred via the bus in the same way as normal data. The control port is given a unique logical channel number but may not be used for data channels. This means that the interface status may be carried across the network with the data and will be updated typically every 20 mS. In addition the interface status is available via a separate microprocessor port and may be read or set independently of the direct transfer mechanism. Common channel signalling may be used to transfer the interface status across the network using the signalling channel.

Figure 9:
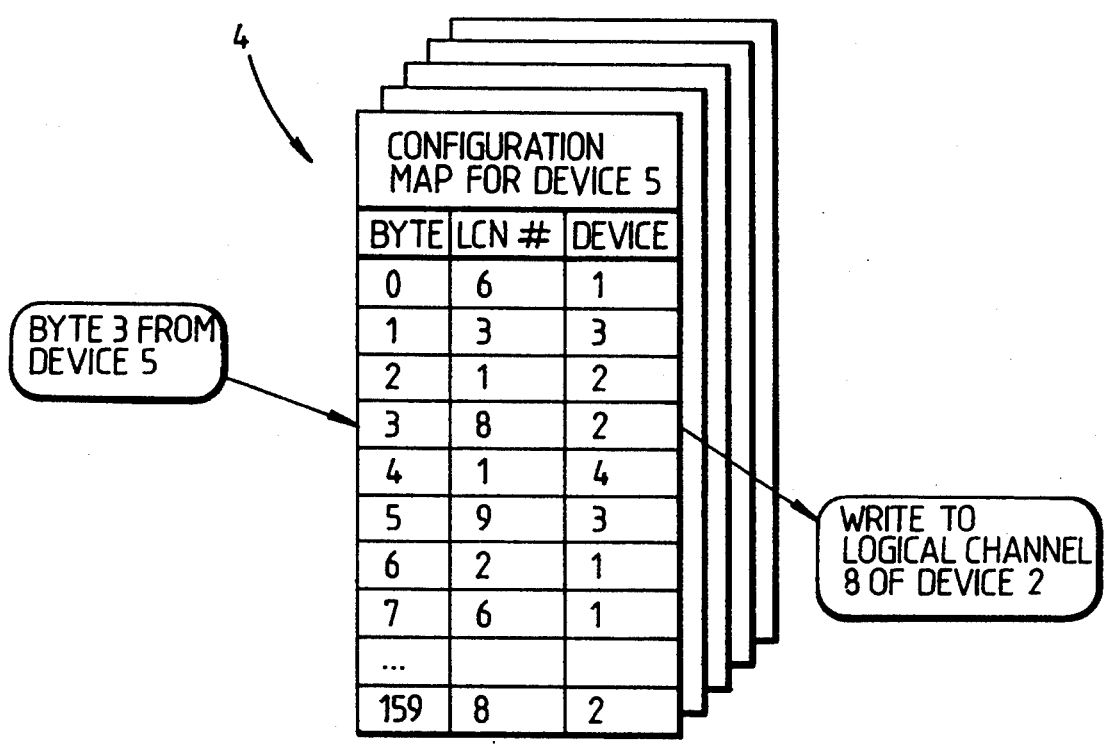
FIG. 9 shows details of part of a look-up table.

Incoming serial data is converted into 8 bit parallel format. When a complete byte has been assembled the device ID and the byte position are used to obtain the destination device and logical channel using a look-up table in the manner described above. The look-up table may be held either within the serial interface device or in external memory. If the device is configured as a simple port, the byte position value has no significance and is pre-set to some arbitrary value. FIG. 9 shows detail of part of a look-up table 4 mapping byte positions from a given device to the appropriate logical channel numbers and destination device numbers.

In the case of multiplexed data received via one of the aggregate switching modules A1–Am the incoming multiplexed frame contains synchronisation information and hence the start of a frame may be uniquely determined. Data bytes are read sequentially and their position within the incoming frame, that is their byte slot number, and device ID converted via the look-up (translation) table to give the destination device and logical channel. When the destination is a data port it has a single logical channel. The frame buffer 5 associated with the output stage is used as a FIFO queue to remove timing irregularities.

Simply by altering the mapping defined by the look-up table the method described above can carry out any form of switching operation including by-pass, drop and insert, cross connect etc.

Figure 5:
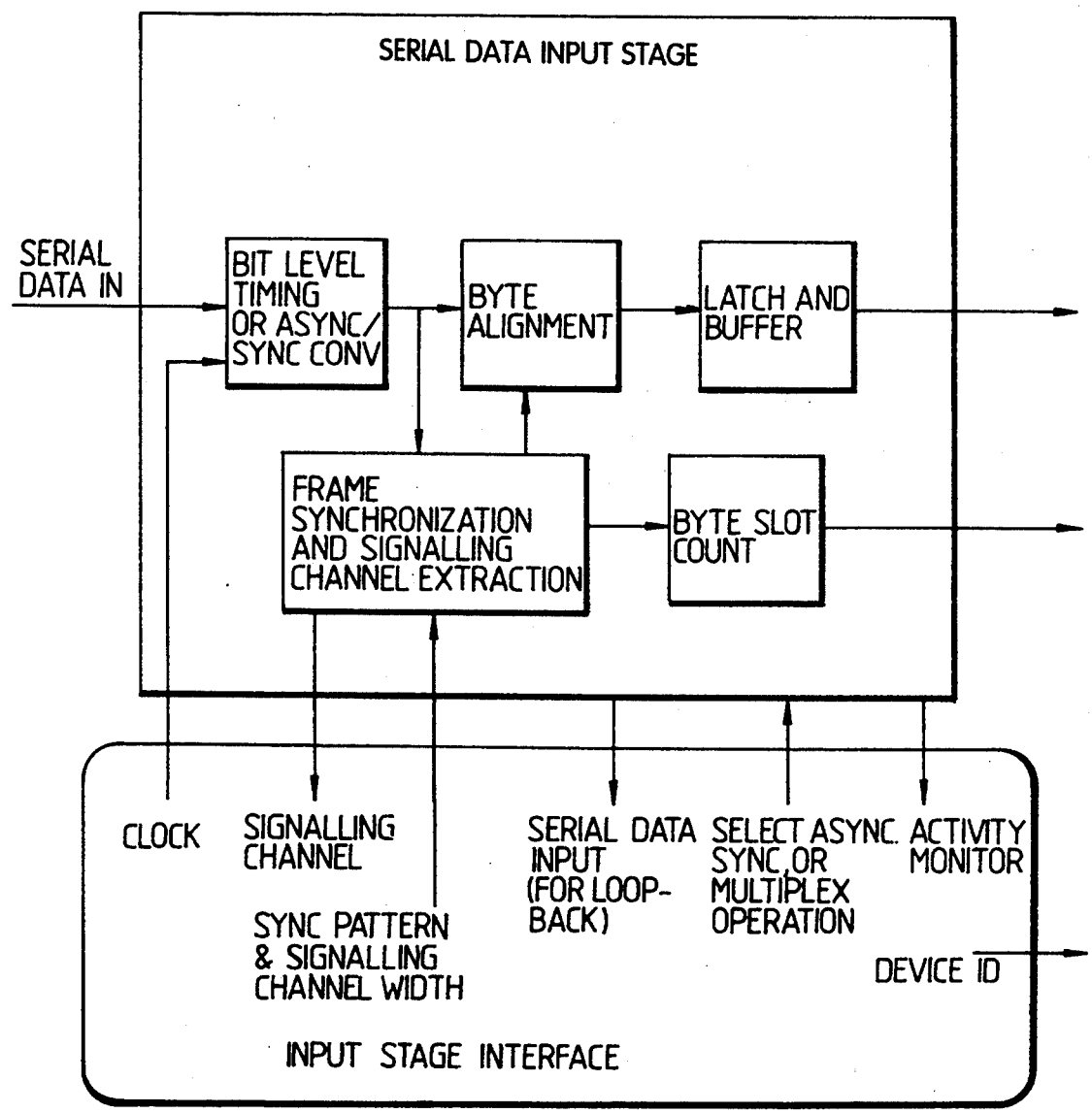
FIG. 5 is a block diagram of a serial data input stage.

FIG. 5 shows an input stage of an aggregate switching module Am. The input stage consists of 5 basic elements:

(i) bit level timing and asynchronous/synchronous converter. Incoming serial data is sampled using a receive clock and, if set to asynchronous mode, asynchronous to synchronous conversion of the type defined in the CCITT V22 standard is applied.

(ii) frame synchronisation and signalling channel extraction—this element is only enabled if the received data stream is multiplexed. The frame synchronisation pattern is detected (and corrective action taken if it is not detected for k successive frames). The bytes corresponding to the signalling channels are extracted and routed to the input signalling channel processing stage.

(iii) Byte alignment—as the multiplexer uses byte interleaving it is necessary to align- incoming data in order that channels may be correctly extracted. This element consists essentially of a serial to parallel converter that can be reset on command from the frame synchronisation stage.

(iv) Latch and buffer—a received byte is temporarily held in a latch whilst the device is contending for use of the bus.

(v) Byte slot counter—in order that received frames can be de-multiplexed it is necessary to provide the received byte slot number and the device ID. The first of these is provided by a simple counter which is incremented for each byte received, and the second is programmed during system initiatisation.

The output stage (FIG. 8) of the aggregate switching modules A1–Am is more complex than the input but incorporates the heart of the multiplexing technique. From the bus, the stage (i.e., the output buffer 5) receives a data byte and logical channel number. The key to the operation of the stage is then the manner in which it determines where to write the data.

Figure 6:
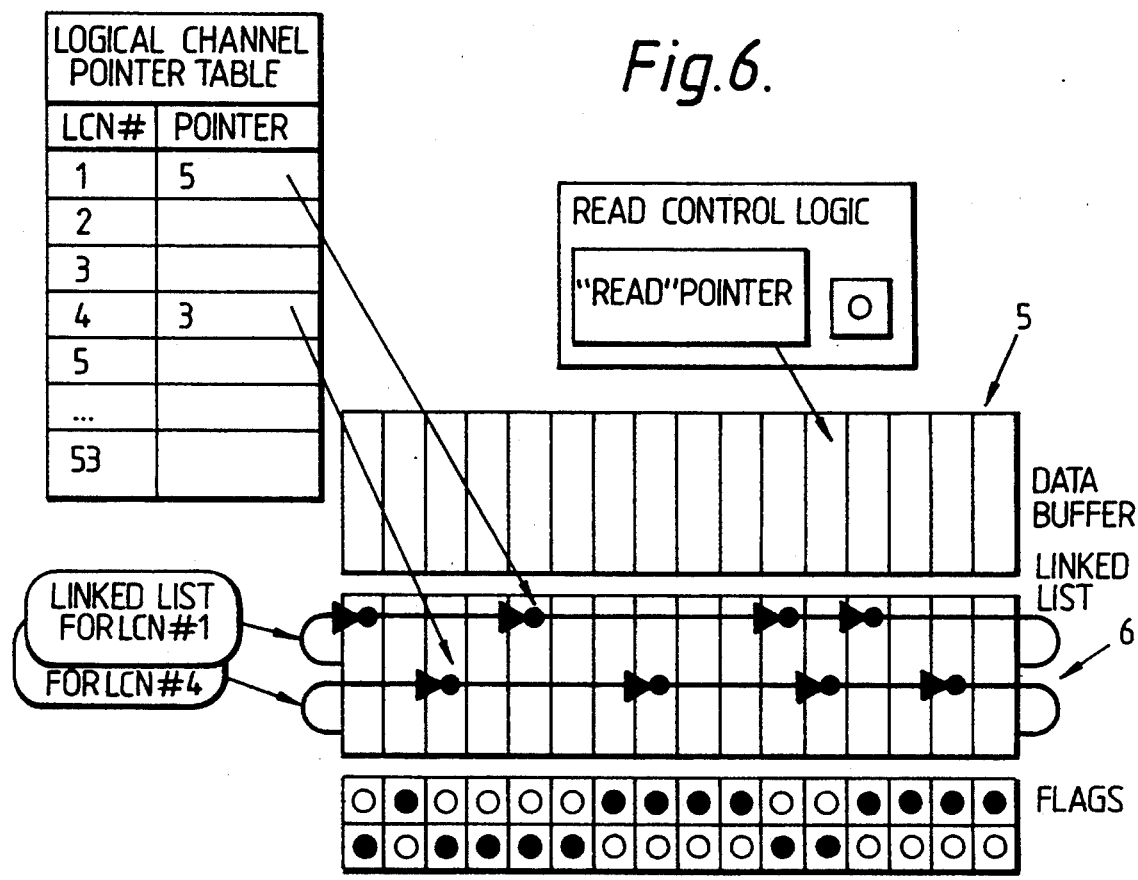
FIG. 6 is a diagram showing the mapping of logical channels into a data frame.

The output buffer contains 160 sets, each set comprising a data byte, linked list pointer, read flag and written flag. Within the linked list field 6 (see FIG. 6) a circular linked list exists for each active logical channel. If the output is a simple port the list corresponds to a single logical channel. A separate index table contains a write pointer for each logical channel which corresponds to the next empty position in the buffer for that logical channel. FIG. 6 shows schematically the manner in which linked lists are used to allocate data bytes to logical channels rather than literal byte positions within the outgoing data frame.

Figure 7A:
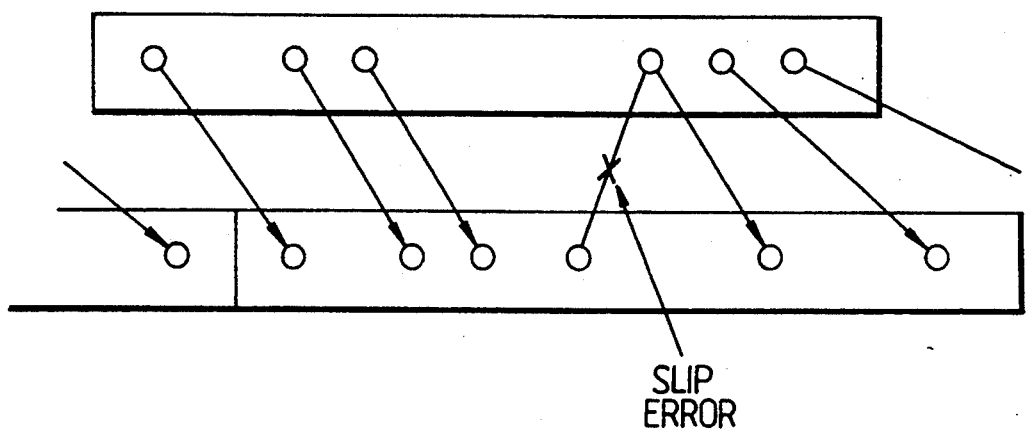
FIG. 7A is a diagram showing slip error between incoming and outgoing frames.
Figure 7B:
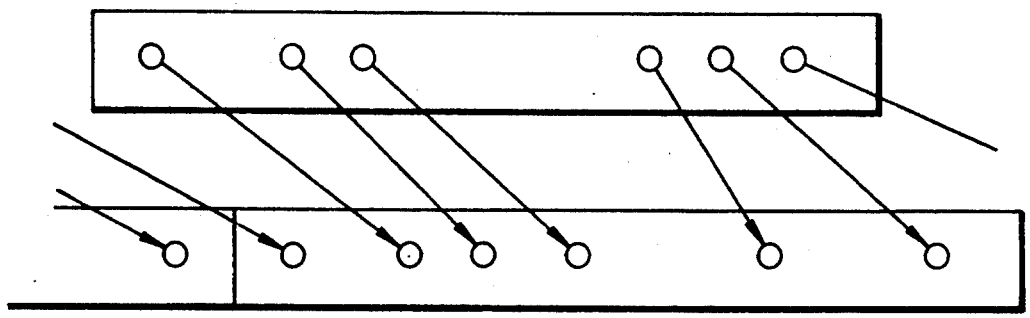
FIG. 7B is a diagram showing the frames of FIG. 7A after realignment.

The incoming logical channel number provides direct access to the corresponding write pointer. The pointer is read and used to access the next empty buffer position for the channel. The data byte is written to the buffer, the corresponding written flag set, and the next write pointer read from the link list and placed back in the index table. A read pointer is used to access the 160 data bytes sequentially. As each byte is read the written flag is cleared and the read flag set. For the first byte written to a logical channel a search procedure is used to find the write pointer position corresponding to minimum delay. During the first frame following initialisation buffer underflow may occur resulting in errors in the logical channel output stream. FIG. 7A shows slip-error of this type occurring. A "slip-procedure" is used to allow the relative positions of incoming and outgoing data bytes to slide increasing the delay until no further errors occur. This process affects only the logical channel concerned and does not interfere with any other channels. FIG. 7B shows the logical channel mapping after re-alignment.

Figure 8:
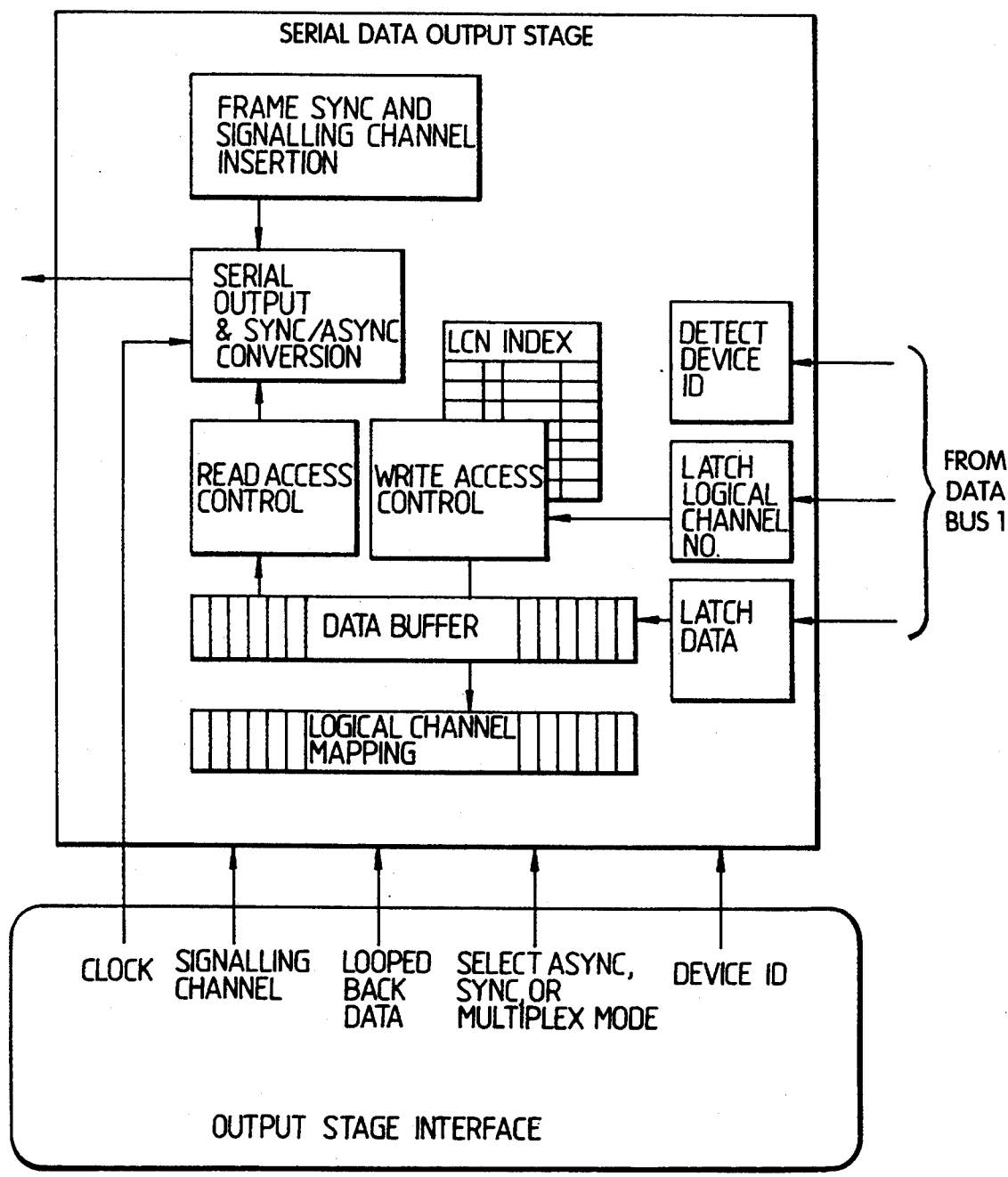
FIG. 8 is a block diagram of a serial data output stage.

In addition to the buffer control logic the output stage shown in FIG. 8 contains the following elements:

(i) frame synchronisation word generation and signalling channel insertion circuits.

(ii) serial output stage incorporating synchronous-/asynchronous conversion.

(iii) loopback data insertion.

The operation of the remaining elements of the output stage are substantially the inverse of the corresponding element of the input stage.

As an alternative to the preferred embodiment described above, the look up table 4 used to map incoming device number and byte slot number to outgoing device number and logical channel number may be distributed amongst the switching modules. Each switching module would then hold a small look-up table containing a destination device number and logical channel number. This alternative embodiment has the advantages of reduced component count and improved bus capacity but the disadvantage of requiring additional memory capacity within the switching module.

As a further alternative means of implementing the present invention the memory used to hold the linked lists pertaining to the output stage of the switching modules could be physically located in a common device, however the logic related to the control of the output remains located within the switching module. This alternative embodiment has the possible advantage of permitting the use of a standard memory integrated circuit rather than requiring memory to be available in each switching module, and the disadvantage of requiring a greater degree of activity on the bus connecting the control logic to the memory device during slip events which in the preferred embodiment occurs internally within each switching module.

It will be appreciated that where in the described embodiment mention is made of a logical channel number in relation to a low-speed non-multiplexed data stream, this is merely a reference to the non-operational number output by the control module and which the port module does not process.

We claim:

1. A data switching node comprising:
   a plurality of data lines including high speed data lines and low speed data lines and a switch connected to said data lines and arranged to switch data from a first one of the data lines to a selected second other one of the data lines,
   said switch including a distributed multiplexer having a number of switching modules connected in parallel to a common data bus and arranged to communicate data with said common data bus and a control means also connected to said common data bus and arranged to communicate control signals with said common data bus to control addressing of the switching modules such that data received by a source switching module connected to said first data line is transmitted directly via the common data bus to a destination switching module connected to said second data line in response to a control signal from the control means,
   said control means being responsive to a data bus address, placed on said common data bus by said source switching module to identify itself, to associate data, which has been received by said source switching module and placed on said common data bus, with a data bus address of said destination switching module and with a respective logical channel of an outgoing multiplexed data frame of the destination switching module,
   said destination switching module being arranged to associate with said respective logical channel a predetermined number of free time slots in the outgoing data frame to provide a corresponding data rate capacity for that channel, and
   said destination switching module being arranged to assemble successively received data associated with a given logical channel into time slots of the outgoing multiplexed data frame in accordance with successive members of a corresponding logical channel-associated circular linked list of time slot numbers corresponding to outgoing time slots, and to step a current pointer of said linked list each time that the respective received data is assembled into its corresponding outgoing time slot.

2. A data switching node according to claim 1, in which the control means includes a look-up table means arranged in response to said data bus address placed on said common data bus by said source switching module in association with the data from said first data line to provide said data bus address of the destination switching module and said respective logical channel and to enable said destination switching module so that it reads data from said common data bus and outputs it in the outgoing data frame on said second data line.

3. A data switching node according to claim 1, in which said destination switching module is arranged, in the event that an outgoing time slot of said logical channel is processed for output in said data frame before the corresponding received data has been assembled into it, to step the current pointer of said linked list.

4. A data switching node according to claim 1, in which said destination switching module is arranged to assemble said received data into respective outgoing time slots of the associated logical channel such that for at least one of said received data the respective pointer current at the time of assembly into the corresponding outgoing time slot corresponds to the next successive time slot of the associated logical channel relative to the current time slot of the data frame being processed for output by said destination switching module at said time of assembly of said received data.

5. A method of operating a multiplexer which receives a plurality of channels and transmits the channels in respective interleaved time slots of an outgoing multiplexed data frame, said method comprising the steps of:
   associating a respective logical channel of an outgoing data frame with an incoming channel,
   associating with said respective logical channel a predetermined number of free time slots in the outgoing data frame to provide corresponding data capacity for said respective logical channel, the predetermined number of free time slots being defined by a corresponding logical channel-associated circular linked list of time slot numbers corresponding to outgoing time slots,
   placing the data of successive timeslots of an incoming channel on a common data bus together with a first data bus address to identify the incoming channel,
   responding to the first data bus address placed on the common data bus to place on the common data bus a second data bus address identifying said outgoing data frame, together with the respective associated logical channel, and
   assembling the data of said successive time slots of the incoming channel into the respectively associated time slots of the outgoing data frame in accordance with successive members of the corresponding linked list, each said data being read from the common data bus and assembled into a respective one of the time slots of the outgoing data frame as defined by a current pointer of said linked list, said current pointer being stepped each time that the respective received data is assembled into its corresponding outgoing time slot.

6. A method according to claim 5, in which for at least one of said received data the respective pointer current at the time of assembly into the corresponding outgoing time slot corresponds to the next successive time slot of the associated logical channel relative to the current time slot being processed for output by said destination switching module at said time of assembly of said received data.

7. A method according to claim 5, including:
detecting the occurrence of time lag between incoming and outgoing data and altering the correspondence between said successive members of the corresponding linked list with respect to said data of the incoming channel.

8. A method according to claim 5, in which the multiplexer includes a plurality of switching modules connected to the common data bus and a control module connected to the common data bus and including a look-up table, in which incoming data channels at each switching module are mapped to outgoing logical channels by reference to the look-up table in the control module.

9. A method according to claim 8, in which at least one switching module includes an output buffer and outgoing logical channels are mapped to outgoing time slots in said output buffer.

10. A data switching node according to claim 6, wherein said predetermined number is n, and the n free time slots of said respective logical channel are determined by selecting, from time slots currently free in the outgoing frame, n consecutive free time slots.

11. A data switching node comprising:
a plurality of data lines including high speed data lines and low speed data lines and a switch connected to said data lines and arranged to switch data from a first one of the data lines to a selected second other one of the data lines,
said switch including a distributed multiplexer having a number of switching modules connected in parallel to a common data bus and arranged to communicate data with said common data bus and a control means also connected to said common data bus and arranged to communicate control signals with said common data bus to control addressing of the switching modules such that data received by a source switching module connected to said first data line is transmitted directly via said common data bus to a destination switching module connected to said second data line in response to a control signal from the control means,
said control means being arranged to associate with data, which has been received by said source switching module and placed on said common data bus, a data bus address of said destination switching module and a respective logical channel of an outgoing multiplexed data frame of the destination switching module,
said destination switching module being arranged to associate with said respective logical channel a predetermined number of free time slots in the outgoing data frame to provide a corresponding data rate capacity for that channel, and
said destination switching module being arranged to assemble successively received data associated with a given logical channel into time slots of the outgoing multiplexed data frame in accordance with successive members of a corresponding logical channel-associated circular linked list of time slot numbers corresponding to outgoing time slots, and to step a current pointer of said linked list each time that the respective received data is assembled into its corresponding outgoing time slot.

12. A data switching node according to claim 11, in which the control means includes a look-up table means arranged in response to said data bus address placed on said common data bus by said source switching module in association with the data from said first data line to provide said data bus address of the destination switching module and said respective logical channel and to enable said destination switching module so that it reads data from said common data bus and outputs it in the outgoing data frame on said second data line.

13. A data switching node according to claim 11, in which said predetermined number is n, and said destination switching module being arranged to select, from time slots currently free in the outgoing data frame when said logical channel is established in the outgoing data frame, n consecutive time slots.

14. A data switching node according to claim 11, in which the control means includes respective look-up tables included within each of the switching modules and arranged in response to data received from said first data line to provide said data bus address of said destination switching module and the associated logical number.

15. A data switching node according to claim 11, in which said predetermined number is n, and said destination switching module being arranged to select, from time slots currently free in the outgoing data frame when said logical channel is established in the outgoing data frame, n consecutive time slots.

16. A data switching node according to claim 15, in which said destination switching module is arranged to select said n time slots on the basis of the n lowest time slot numbers of said currently free time slots.

17. A method of operating a multiplexer which receives a plurality of channels and transmits the channels in respective interleaved time slots of an outgoing multiplexed data frame, said method comprising the steps of:
associating a respective logical channel of an outgoing data frame with an incoming channel,
associating with said respective logical channel a predetermined number of free time slots in the outgoing data frame to provide corresponding data capacity for said respective channel, the predetermined number of free time slots being defined by a corresponding logical channel-associated circular linked list of time slot numbers corresponding to outgoing time slots,
placing the data of successive time slots of an incoming channel on a common data bus in association with the respective associated logical channel and a data bus address identifying said outgoing data frame, and
assembling the data of said successive time slots of the incoming channel into the respectively associated time slots of the outgoing data frame in accordance with successive members of the corresponding linked list, each said data being read from the common data bus and assembled into a respective one of the time slots of the outgoing data frame as defined by a current pointer of said linked list, said current pointer being stepped each time that the respective received data is assembled into its corresponding outgoing time slot.

18. A method according to claim 17, including:
detecting the occurrence of time lag between incoming and outgoing data and altering the correspondence between said successive members of the corresponding linked list with respect to said data of the incoming channel.

19. A method according to claim 17, in which at least one switching module includes an output buffer and outgoing logical channels are mapped to outgoing time slots in said output buffer.

20. A method according to claim 19, in which at least one switching module includes an output buffer and outgoing logical channels are mapped to outgoing time slots in said output buffer.

21. A method according to claim 17 wherein said predetermined number is n and said destination switching module being arranged to select, from time slots currently free in the outgoing data frame when said logical channel is established in the outgoing data frame, n consecutive time slots.

22. A method according to claim 17, in which the multiplexer includes a plurality of switching modules connected to the common data bus, each switching module including a look-up table and being arranged to map a said incoming data channel to a said outgoing logical channel by reference to its associated look-up table.

23. A method according to claims 22, in which at least one switching module includes an output buffer and outgoing logical channels are mapped to outgoing time slots in said output buffer.

24. A data switching node according to claim 11, in which said destination switching module is arranged, in the event that an outgoing time slot of said logical channel is processed for output in said data frame before the corresponding received data has been assembled into it, to step the current pointer of said linked list.

25. A data switching node according to claim 17, in which said destination switching module is arranged, in the event that an outgoing time slot of said logical channel is processed for output in said data frame before the corresponding received data has been assembled into it, to step the current pointer of said linked list.

26. A method according to claim 10, wherein the selected n free time slots have the n lowest time slot numbers of said time slots currently free in the outgoing data frame at selection.

27. A data switching node according to claim 13, in which said destination switching module is arranged to select said n time slots on the basis of the n lowest time slot numbers of said currently free time slots.

* * * * *